Patented Dec. 15, 1931

1,837,162

UNITED STATES PATENT OFFICE

ROGER B. HILL, OF BERLIN, NEW HAMPSHIRE, ASSIGNOR TO BROWN COMPANY, OF BERLIN, NEW HAMPSHIRE, A CORPORATION OF MAINE

TREATMENT OF RUBBER LATEX AND PRODUCT OF SAME

No Drawing.   Application filed June 22, 1929.   Serial No. 373,055.

This invention relates to the conditioning of latex for impregnation purposes, an object being to modify the characteristics of latex so that it is more suitable for use in the impregnation of porous foundations more particularly of a fibrous character. It further relates to the manufacture of impregnated porous foundations, another object being to improve the characteristics of the dried, latex-impregnated product, including better ageing qualities and greater uniformity of distribution of rubber through the product.

Latex as derived from nature is a complex dispersion of low stability. It consists of various solids dispersed in an aqueous medium, the usual latex having a solids content of about 33% to 37%, of which about 3% to 10% may be non-rubber solids, including proteins, resins, sugars, and mineral salts. The rubber-hydrocarbon is generally supposed to be present as microscopic globules enveloped by protein coatings which undergo putrefaction and rupture when the latex is allowed to stand, resulting in a coagulation of the rubber. It has been the practice when shipping or storing latex for use in the arts to add ammonia as a preservative, the ammonia evidently combining with the protein and resin content of the latex to form the more stable proteinates and resinates as the protective colloids. Ammonia-preserved latex finds usefulness in the impregnation of porous foundations, particularly of a fibrous character, e. g. yarns, cords, fabrics and webs of interfelted cellulose fiber, as such impregnation, followed by drying and, if desired, vulcanization, imparts certain desirable qualities, such as water resistance, to the product. When a paper or web composed of cellulose fiber is impregnated with latex and then dried, it acquires many of the important characteristics of natural leather, including body, strength, resistance to tear, water repellency, feel, and the like. This is particularly true when a web composed of a loosely felted, highly absorbent cellulose fiber, such as cotton or refined wood pulp, is used as the foundation, as in such case the dried, latex-impregnated product may contain 50% or even more rubber and still have the porosity and other characteristics associated with natural leather. One of the problems arising in the impregnation of porous foundations, however, is that setting or coagulation of the rubber during drying of the latex-impregnated foundation takes place slowly, and further that the rubber particles tend to migrate to the surface where evaporation of water is taking place, resulting in a product which is non-uniform in respect of distribution of rubber therethrough. Evidently the colloids (i. e., the proteinates and resinates) present in the latex retard setting or coagulation of the rubber in situ in the foundation, so that in the case of a highly porous web of interfelted cellulose fiber, where capillary action is high, considerable migration of rubber to the surface of the web may take place during the drying operation, the center of the web being left relatively poorer in rubber so that it may easily be split apart.

I have found that if certain of the non-rubber solids of latex, and more particularly the protective colloids present therein, are converted to an insoluble, non-protective condition, the latex is greatly improved for impregnation purposes, it being possible to realize a dried, latex-impregnated, porous foundation having much greater uniformity in respect of its rubber content. For instance, it has been found that when a web composed of losely felted cellulose fiber is impregnated with the latex thus treated and then dried, setting or coagulation of the rubber in situ in the web is considerably hastened and the so-called "ply adhesion" or tenacity of bond between the face portions of the resulting sheet is remarkably enhanced. Doubtless the improved ply adhesion is attributable to the greater uniformity of rubber distribution through the dried product, which, in turn, is made possible by destroying the protective action of the protective colloid originally present in the latex, so that the rubber particles coalesce quickly during the drying of the sheet and do not tend to migrate to the surface. The desired modification of the latex may be brought about by the addition of metal compounds whose metal radicals precipitate the protective colloids, the alkaline earth metal hydroxides, and more especially slaked lime, being suitable for this purpose. Such hydroxides may not, however, be used without due care, for even when latex is amply preserved with ammonia, the addition of a hydroxide such as lime as a suspension or slurry in water of a concentration designed not to cause an undue dilution of the latex, may result in the coagulation of considerable rubber, such coagulation interfering with the use of the latex to effect a rapid and uniform penetration of porous foundations. I have found that such coagulating difficulties may be overcome by first treating the latex with protective colloids such as soluble soaps or caseinates which are capable of being precipitated by lime as insoluble calcium soaps or caseinates along with the protective colloid content of the latex. Strongly basic hydroxides such as caustic soda or caustic potash may be added together with or in lieu of such protective colloids, their function evidently being to combine with the protein and resin content of the latex and to slow down a conversion of the resulting colloids into insoluble, non-protective condition, thus avoiding a quick or violent chemical reaction which causes coagulation.

A specific example of procedure designed to modify the characteristics of latex so that it is eminently suitable for the manufacture of an artificial leather for shoe insoles will now be given. An ammonia-preserved latex having a solids content of about 33% to 37% and a pH value of about 10.5 to 11.0 may be used as a raw material. To this latex is added with stirring sufficient soluble caseinate to prevent coagulation when slaked lime is later added for the purpose previously described. The soluble caseinate may be in the form of an aqueous solution of ammonium caseinate of about 20% strength, which may be prepared by soaking about 7½% casein, based on the weight of latex solids, in water for about half an hour, then adding strong ammonia water (28% aqua ammonia), and heating the mixture with stirring for about fifteen minutes at about 60° to 70° C. After the ammonium caseinate solution has been uniformly disseminated throughout the latex, about 7% to 10% slaked lime, based on the weight of latex solids, is added as in the form of a suspension or slurry in water containing about 10% to 25% lime. This amount of lime is in excess of that actually needed to convert all the protective colloids present in the latex to an insoluble non-protective condition, but the excess not only ensures the desired reaction but also serves as a desirable filler or loading material in the final impregnated product. Being a comparatively insoluble material, lime is not objectionable in the impregnated product, as there is no tendency for it to come to the surface of the product during use. When the dried, latex-impregnated product is porous, as is the case of some artificial leathers, the lime doubtless becomes converted into calcium carbonate by the action of the carbon dioxide present in the atmosphere.

The treated latex may be diluted to the solids content desired for impregnation, to, say, about 10% to 20% solids content when it is to be used for the impregnation of a porous web of interfelted cellulose fiber to produce an artificial leather product. If desired, "direct dyes" which impart the color of vegetable-tanned leather to cellulose fibers, sulphur, accelerators of vulcanization, antioxidants, or other rubber-compounding agents, may be added to the latex before impregnation of the web is effected. The web may be impregnated as by dipping into the latex, whereupon the latex-impregnated web may be squeezed to the desired rubber content, say, 40% to 60%, and then dried. The reaction between the lime and protective colloids present in the latex, including the soluble caseinate, probably continues during the drying operation, as the latex becomes more concentrated in reactive constituents. The treated latex is set or coagulated in the web more quickly than an untreated latex, and migration of rubber to the surface of the web is greatly decreased, as attested by the markedly greater ply adhesion of the final product. The final product contains not only fiber and rubber but also excess lime and the protective colloids rendered insoluble by the action of the lime, including calcium caseinate, which imparts dryness of feel and additional stiffness thereto.

The example hereinbefore given may be closely followed when soluble soaps such as sodium oleate are used in lieu of soluble caseinates such as ammonium caseinate, soap being added in amount by weight equal to the casein, and lime being added in amount sufficient to ensure the precipitation of oleate, as well as the naturally-occurring protein and resin content. When using caustic soda or caustic potash, however, in lieu of protective colloids, a solution containing only 1% alkali, based on the weight of the latex, need be used, and the lime may be less than when colloids such as casein or soap are used, as calcium hydroxide is consumed only in reaction upon the soluble proteinates and resinates formed with the caustic alkalies. In such latter case, too, it is preferable to wash the dried, latex-impregnated web free from the excess water-soluble caustic soda or caustic potash, particularly when it is intended for inner sole manufacture.

Other metal compounds such as those of iron, barium, strontium and the like may be used in lieu of slaked lime, but I prefer to use lime, not only because of its economy, but because the treatment may be readily controlled to avoid coagulation of the latex and does not result in objectionable residual unreacted material or objectionable reaction products.

So far as certain subject matter is concerned, this application is a continuation of my application Serial No. 352,328, filed April 3, 1929.

I claim:

1. Steps which comprise adding to latex a protective colloid together with alkali of the nature of caustic soda, and precipitating the added colloid along with colloid naturally associated with the latex without coagulating the rubber.

2. A process which comprises adding to latex alkali of the nature of caustic soda together with protective colloid capable of being precipitated by the metal radical of a metal compound along with the protective colloid naturally associated with the latex, and then adding such metal compound to the latex to effect such precipitation but without coagulating the rubber.

3. A process which comprises adding to latex strongly basic hydroxides of the nature of caustic soda to convert the protective colloid naturally associated with the latex into protective colloid capable of being precipitated by the metal radical of a metal compound without coagulation of the rubber, and then adding such metal compound to effect such precipitation.

4. A process which comprises adding to latex alkali of the nature of caustic soda together with protective colloid capable of being precipitated by slaked lime along with the protective colloid naturally associated with the latex, and then adding slaked lime to the latex to effect such precipitation but without coagulating the rubber.

5. A process which comprises adding to latex alkali of the nature of caustic soda together with a soluble caseinate, and then adding slaked lime to precipitate the caseinate and the colloid naturally associated with the latex but without coagulating the rubber.

6. An uncoagulated latex containing added alkali of the nature of caustic soda and whose natural protective colloids have been precipitated along with added protective colloids in situ in said latex.

7. An uncoagulated latex containing added alkali of the nature of caustic soda and whose natural protective colloids have been precipitated along with added soluble caseinate in situ in said latex.

8. An uncoagulated latex containing added alkali of the nature of caustic soda and whose natural protective colloids have been precipitated along with added soluble caseinate in the form of calcium compounds in situ in said latex.

9. An uncoagulated latex containing added alkali of the nature of caustic soda and whose natural protective colloids have been precipitated along with added soluble soap in situ in said latex.

10. An uncoagulated latex containing added alkali of the nature of caustic soda and whose natural protective colloids have been precipitated along with added soluble soap in the form of calcium compounds in situ in said latex.

11. An uncoagulated latex containing added alkali of the nature of caustic soda and lime and also containing colloids precipitated in situ in the latex in the form of calcium compounds, including calcium compounds of colloids natural to the latex and calcium compounds of colloids added to the latex.

12. An uncoagulated latex containing added alkali of the nature of caustic soda and lime and also containing colloids precipitated in situ in the latex in the form of calcium compounds, including calcium compounds of colloids natural to the latex and calcium caseinate.

13. An uncoagulated latex containing added alkali of the nature of caustic soda and lime and also containing colloids precipitated in situ in the latex in the form of calcium compounds, including calcium compounds of colloids natural to the latex and calcium soap.

14. A substantially uncoagulated latex containing added alkali of the nature of caustic soda and whose natural protective colloids have been precipitated in situ in said latex.

15. A substantially uncoagulated latex containing added alkali of the nature of caustic soda amounting to only about 1% of the weight of the latex and whose natural protective colloids have been precipitated in situ in said latex.

In testimony whereof I have affixed my signature.

ROGER B. HILL.